US012701467B2

(12) United States Patent
Li et al.

(10) Patent No.: US 12,701,467 B2
(45) Date of Patent: Aug. 4, 2026

(54) METHOD OF HANDOVER OF MBS SESSION, AND SYSTEM AND APPARATUS THEREOF

(71) Applicant: ZTE CORPORATION, Shenzhen (CN)

(72) Inventors: Zhendong Li, Shenzhen (CN); Jinguo Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 306 days.

(21) Appl. No.: 18/501,071

(22) Filed: Nov. 3, 2023

(65) Prior Publication Data

US 2024/0155436 A1 May 9, 2024

Related U.S. Application Data

(63) Continuation of application No. PCT/CN2021/092119, filed on May 7, 2021.

(51) Int. Cl.
*H04W 36/00* (2009.01)
*H04W 36/08* (2009.01)
(52) U.S. Cl.
CPC ....... *H04W 36/0007* (2018.08); *H04W 36/08* (2013.01)
(58) Field of Classification Search
None
See application file for complete search history.

(56) References Cited

U.S. PATENT DOCUMENTS

| | | | | |
|---|---|---|---|---|
| 12,425,942 B2* | 9/2025 | Zong | ................. | H04W 36/0007 |
| 2021/0258918 A1* | 8/2021 | Hong | ................ | H04W 36/0007 |
| 2023/0179963 A1* | 6/2023 | Fujishiro | ............... | H04W 48/20 |
| | | | | 370/328 |
| 2023/0284101 A1* | 9/2023 | Dai | ........................ | H04L 1/1893 |
| | | | | 370/331 |
| 2023/0292200 A1* | 9/2023 | Dai | ................... | H04W 36/0007 |
| 2024/0284485 A1* | 8/2024 | Hong | ...................... | H04W 4/06 |

FOREIGN PATENT DOCUMENTS

| | | |
|---|---|---|
| CN | 104303550 A | 1/2015 |
| CN | 111866751 A | 10/2020 |
| CN | 111866975 A | 10/2020 |
| WO | WO-2008/127037 A1 | 10/2008 |

OTHER PUBLICATIONS

3rd Generation Partnership Project, "Study on architectural enhancements for 5G multicast-broadcast services (release 17)" Technical Specification Group Services and System Aspects, 3GPP TR 23,757, V.0.5.0, Sep. 2020.

(Continued)

*Primary Examiner* — Xavier S Wong
(74) *Attorney, Agent, or Firm* — Foley & Lardner LLP

(57) ABSTRACT

A wireless communication method for use in a target wireless network node is disclosed. The method comprises receiving, from a network function, an area identifier of the target wireless network node in a multicast broadcast service, MBS, session during a handover of the MBS session to the target wireless network node.

12 Claims, 7 Drawing Sheets

(56)     References Cited

OTHER PUBLICATIONS

International Search Report and Written Opinion for PCT Appl. No. PCT/CN2021/092119, mailed on Feb. 7, 2022 (7 pages).

"3rd Generation Partnership Project, Technical Specification Group Services and Systems Aspects; Study on architectural enhancements for 5G multicast-broadcast services (Release 17)", 3GPP Draft; SP-210098.Zip 23757-DIFF_V100-V200, 3rd Generation Partnership Project (3GPP), Mobile Competence Centre; 650, Route Des Lucioles; F-06921 Sophia-Antipolis Cedex, France, Mar. 16, 2021 (Mar. 16, 2021), XP051988107, Retrieved from the Internet:URL:https://ftp.3gpp.org/tsg_sa/TSG_SA/TSGs_91E_Electronic/Docs/S.

Extended European Search Report for EP Appl. No. 21939673.6, dated Oct. 25, 2024 (9 pages).

Huawei et al., "KI #6, New Sol: On Local MBS Support", 3GPP TSG-WG SA2 Meeting #140E e-meeting, S2-2005410, Sep. 1, 2020, Elbonia (5 pages).

\* cited by examiner

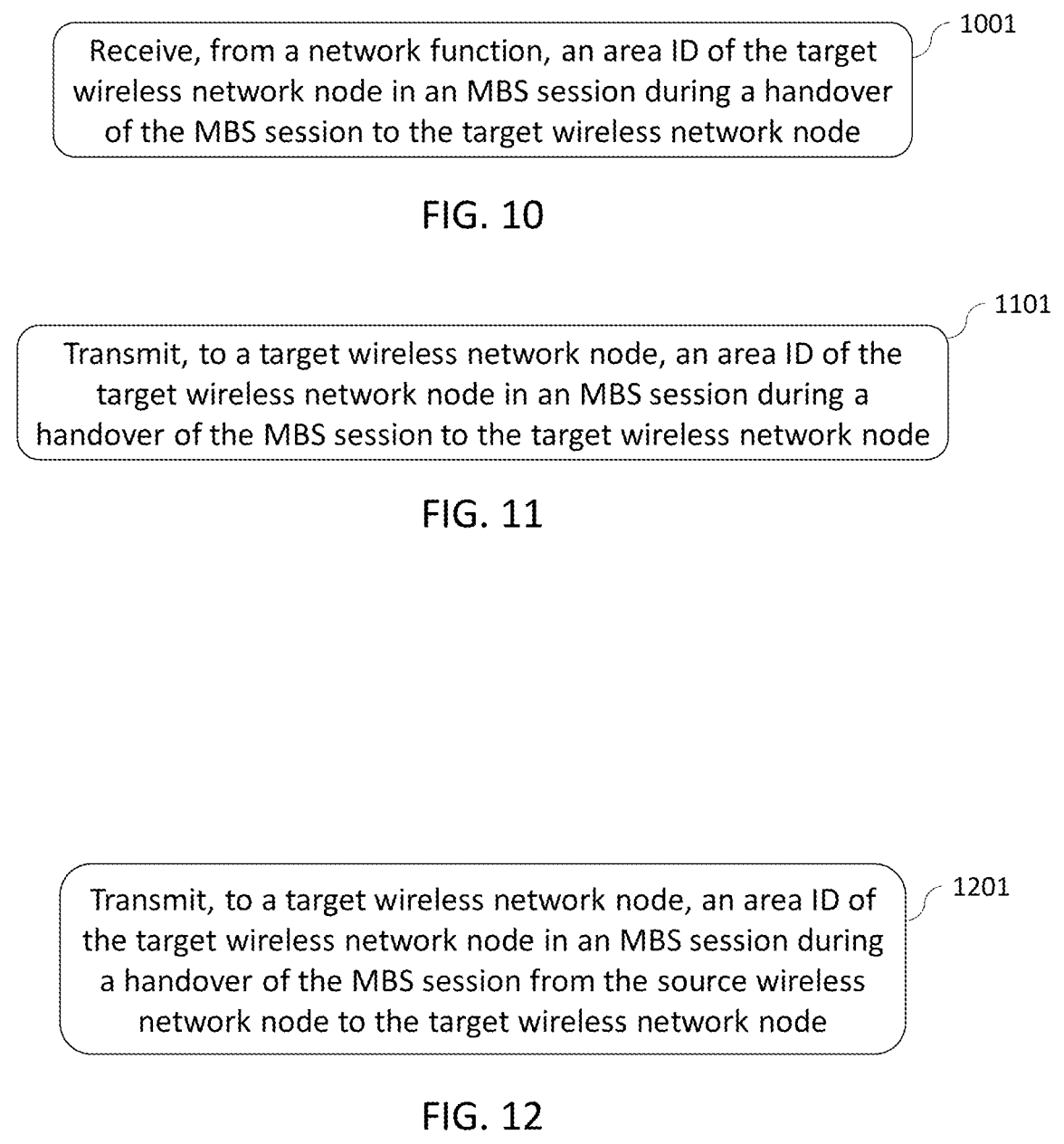

Receive, from a network function, an area ID of the target wireless network node in an MBS session during a handover of the MBS session to the target wireless network node　⌐ 1001

FIG. 10

Transmit, to a target wireless network node, an area ID of the target wireless network node in an MBS session during a handover of the MBS session to the target wireless network node　⌐ 1101

FIG. 11

Transmit, to a target wireless network node, an area ID of the target wireless network node in an MBS session during a handover of the MBS session from the source wireless network node to the target wireless network node　⌐ 1201

FIG. 12

METHOD OF HANDOVER OF MBS SESSION, AND SYSTEM AND APPARATUS THEREOF

CROSS-REFERENCE TO RELATED PATENT APPLICATIONS

This application is a Continuation of PCT Application No. PCT/CN2021/092119, filed May 7, 2021, incorporated herein by reference in its entirety.

TECHNICAL FIELD

This document is directed generally to wireless communications.

BACKGROUND

Local multicast broadcast service (MBS) plays an important role in the MBS. As its name suggests, the local MBS is an MBS provided in particular MBS service area(s). The MBS area is identified by a cell list or a tracking area list. Only the user equipment (UE) within the MBS service area may receive content data of the MBS. When the UE moves outside of the MBS service area, the UE is not allowed to receive the local MBS service.

In addition, location dependent MBS is a local MBS provided in several MBS service areas. The location dependent MBS enables distributions of different content data to different MBS service areas for the same MBS service.

SUMMARY

The content delivered in different MBS service areas of the same MBS service may be different. Therefore, the MBS service area to which a target next generation radio access network (NG-RAN) of a handover procedure belongs needs to be determined. However, in the existing art, when the UE moves between different MBS service areas for the same MBS service, it is not known how to determine the service area of target RAN and how to establish a shared delivery between the target NG-RAN and a multicast-broadcast session management function (MB-SMF).

This document relates to methods, systems, and devices for handover of an MBS session.

The present disclosure relates to a wireless communication method for use in a target wireless network node. The method comprises receiving, from a network function, an area identifier of the target wireless network node in a multicast broadcast service, MBS, session during a handover of the MBS session to the target wireless network node.

Various embodiments may preferably implement the following features:

Preferably or in some embodiments, the network function comprises a source wireless network node associated with the handover.

Preferably or in some embodiments, the wireless communication method further comprises receiving, from the source wireless network node, an area identifier of the source wireless network node.

Preferably or in some embodiments, the network function comprises a session management function.

Preferably or in some embodiments, the wireless communication method further comprises transmitting, to the session management function, a path switch request associated with the MBS session, wherein the area identifier is received in a response of the path switch request.

Preferably or in some embodiments, the area identifier of the target wireless network node is received in a handover request.

Preferably or in some embodiments, the wireless communication method further comprises receiving location information corresponding to the area identifier, wherein the location information comprises at least one of a tracking area identity list associated with the area identifier, a cell list associated with the area identifier, a multicast address associated with the area identifier or a multicast address associated with the MBS session.

Preferably or in some embodiments, the wireless communication method further comprises transmitting, to a multicast broadcast session management function of the MBS session, a request for establishing a downlink tunnel of the MBS session, wherein the request comprises the area identifier of the target wireless network node.

Preferably or in some embodiments, the wireless communication method further comprises receiving, from the multicast broadcast session management function, a response comprising a multicast address associated with the area identifier or a multicast address associated with the MBS session.

The present disclosure relates to a wireless communication method for use in a session management function. The method comprises transmitting, to a target wireless network node, an area identifier of the target wireless network node in a multicast broadcast service, MBS, session during a handover of the MBS session to the target wireless network node.

Various embodiments may preferably implement the following features:

Preferably or in some embodiments, the wireless communication method further comprises receiving, from the target wireless network node, a path switch request associated with the MBS session, wherein the area identifier of the target wireless network node is transmitted in a response of the path switch request.

Preferably or in some embodiments, the area identifier of the target wireless network node is transmitted in a handover request.

Preferably or in some embodiments, the wireless communication method further comprises transmitting, to the target wireless network node, location information corresponding to the area identifier of the target wireless network node, wherein the location information comprises at least one of a tracking area identity list associated with the area identifier, a cell list associated with the area identifier, a multicast address associated with area identifier or a multicast address associated with of the MBS session.

Preferably or in some embodiments, the wireless communication method further comprises receiving, from a multicast broadcast session management function, information of a correlation between each area identifier associated with the MBS session and corresponding location information, wherein the location information comprises at least one of a tracking area identity list associated with the area identifier, a cell list associated with the area identifier, a multicast address associated with the area identifier or a multicast address associated with of the MBS session.

The present disclosure relates to a wireless communication method for use in a source wireless network node. The method comprises transmitting, to a target wireless network node, an area identifier of the target wireless network node in a multicast broadcast service, MBS, session during a handover of the MBS session from the source wireless network node to the target wireless network node.

Various embodiments may preferably implement the following feature:

Preferably or in some embodiments, the wireless communication method further comprises transmitting, to a target wireless network node, an area identifier of the source wireless network node.

The present disclosure relates to a target wireless network node, comprising:

a communication unit, configured to receive, from a network function, an area identifier of the target wireless network node in a multicast broadcast service, MBS, session during a handover of the MBS session to the target wireless network node.

Various embodiments may preferably implement the following features:

Preferably or in some embodiments, the target wireless network node further comprises a processor configured to perform any of aforementioned wireless communication methods.

The present disclosure relates to a wireless device comprising a session management function. The wireless device comprises:

a communication unit, configured to transmit, to a target wireless network node, an area identifier of the target wireless network node in a multicast broadcast service, MBS, session during a handover of the MBS session to the target wireless network node.

Various embodiments may preferably implement the following feature:

Preferably or in some embodiments, the wireless device further comprises a processor configured to perform any of aforementioned wireless communication methods.

The present disclosure relates to a source wireless network node, comprising:

a communication unit, configured to transmit, to a target wireless network node, an area identifier of the target wireless network node in a multicast broadcast service, MBS, session during a handover of the MBS session from the source wireless network node to the target wireless network node.

Various embodiments may preferably implement the following feature:

Preferably or in some embodiments, the source wireless network node further comprises a processor configured to perform any of aforementioned wireless communication methods.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 10 shows a flowchart of a method according to an embodiment of the present disclosure.

FIG. 11 shows a flowchart of a method according to an embodiment of the present disclosure.

FIG. 12 shows a flowchart of a method according to an embodiment of the present disclosure.

DETAILED DESCRIPTION

Figure 1:
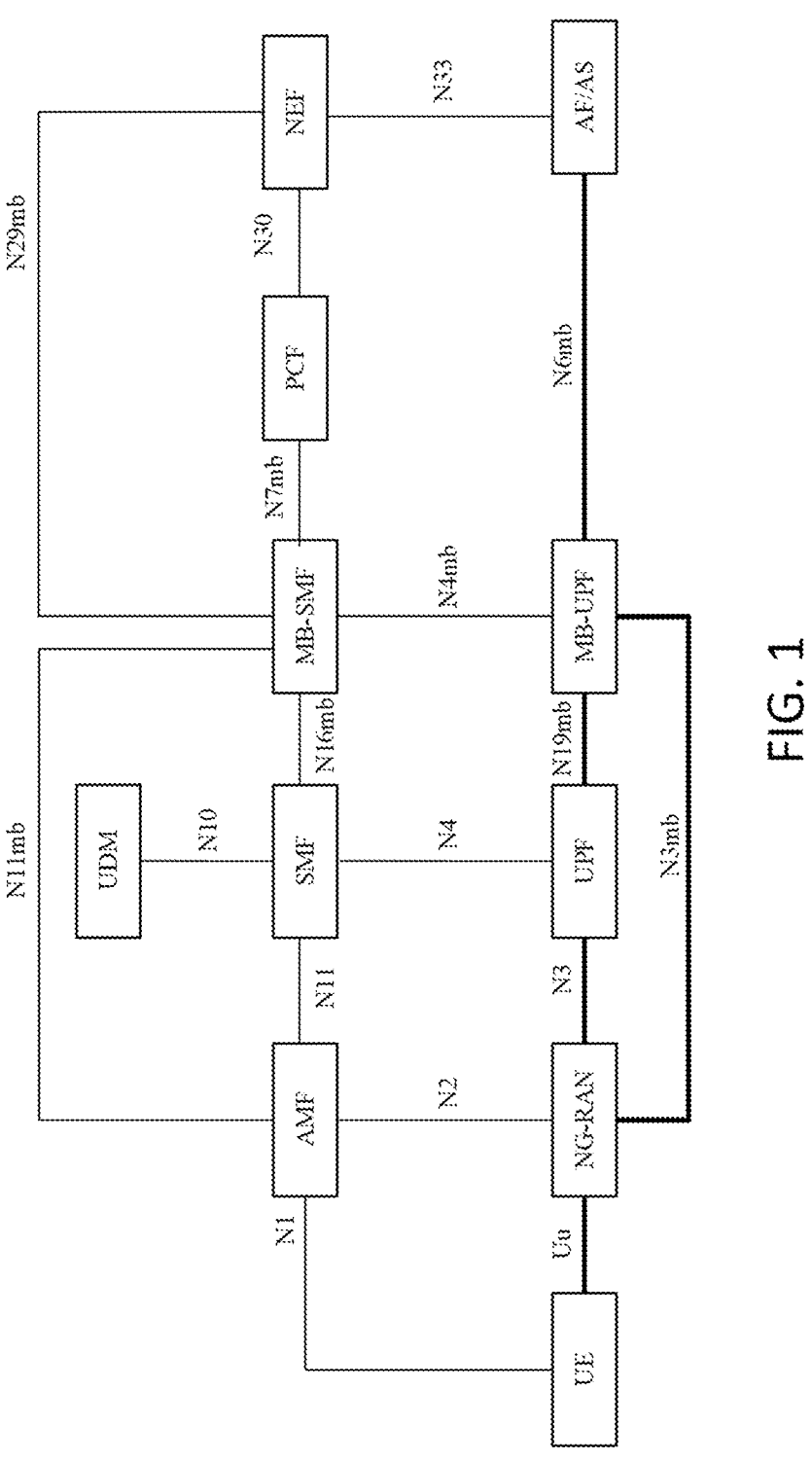
FIG. 1 shows a schematic diagram of a network architecture according to an embodiment of the present disclosure.

FIG. 1 shows a schematic diagram of a network architecture according to an embodiment of the present disclosure. The network architecture may provide the MBS. There are two types of MBS session: Broadcast MBS session and Multicast MBS session. In an embodiment, the MBS session refers to the multicast MBS session in the present disclosure. The network architecture shown in FIG. 1 comprises two types of network functions, i.e., common network functions and MBS particular network functions, which are illustrated in the following.

Common Network Functions:

1. User equipment (UE) accessing $5^{th}$ generation system (5GS) obtains services via an NG-RAN and interacts with an Access and Mobility Control Function (AMF) of the core network via NAS signaling.

2. NG-RAN (i.e. 5G Radio Access Network)

The NG-RAN is responsible for air interface resource scheduling and air interface connection management of the network to which the UE accesses. In the present disclosure, the NG-RAN (node) may refer to RAN (node).

3. AMF (Access and Mobility Management Function)

The AMF includes the following functionalities: registration management, connection management, reachability management and mobility management. The AMF also performs the access authentication and access authorization. The AMF is the NAS security termination and relays the SM NAS between the UE and the SMF, etc.

4. SMF (Session Management Function)

The SMF includes the following functionalities: session management (e.g., session establishment, modify and release), UE internet protocol (IP) address allocation & management, selection and control of user plane (UP) function, downlink data notification, etc.

5. UPF (User Plane Function)

The UPF includes the following functionalities: anchor point for intra-/inter-RAT mobility, packet routing & forwarding, traffic usage reporting, quality of service (QoS) handling for the UP, downlink packet buffering and downlink data notification triggering, etc.

6. UDM (Unified Data Management)

The UDM manages the subscription profile for the UEs. The subscription includes the data used for mobility management, session management. The AMF and SMF get the subscription from the UDM.

7. PCF (Policy Control Function)

The PCF includes the following functionality: supporting unified policy framework to govern network behavior and providing policy rules to control plane function(s) to enforce the policy rules.

8. NEF (Network Exposure Function)

The NEF is deployed optionally for exchanging information between the 5G core network (5GC) and an external third party.

9. AF/AS (Application Function/Application Server).

The AF/AS provides the services over the 5GS.

MBS particular network functions:

1. MB-SMF (Multicast-Broadcast SMF)

The MB-SMF is responsible for MBS session management, including: QoS control, configuring the MB-UPF, interacting with SMF to modify PDU session associated with MBS session, interacting with RAN (via AMF and SMF) to establish data transmission resources between MB-UPF and RAN nodes, etc.

2. MB-UPF (Multicast-Broadcast UPF)

The MB-UPF is responsible for packet filtering of incoming downlink packets for multicast and broadcast flows, QoS enforcement, delivery of multicast and broadcast data to the RAN nodes, etc.

For the multicast MBS session, the UE needs to join the multicast MBS session before receiving multicast service data.

Figure 2:
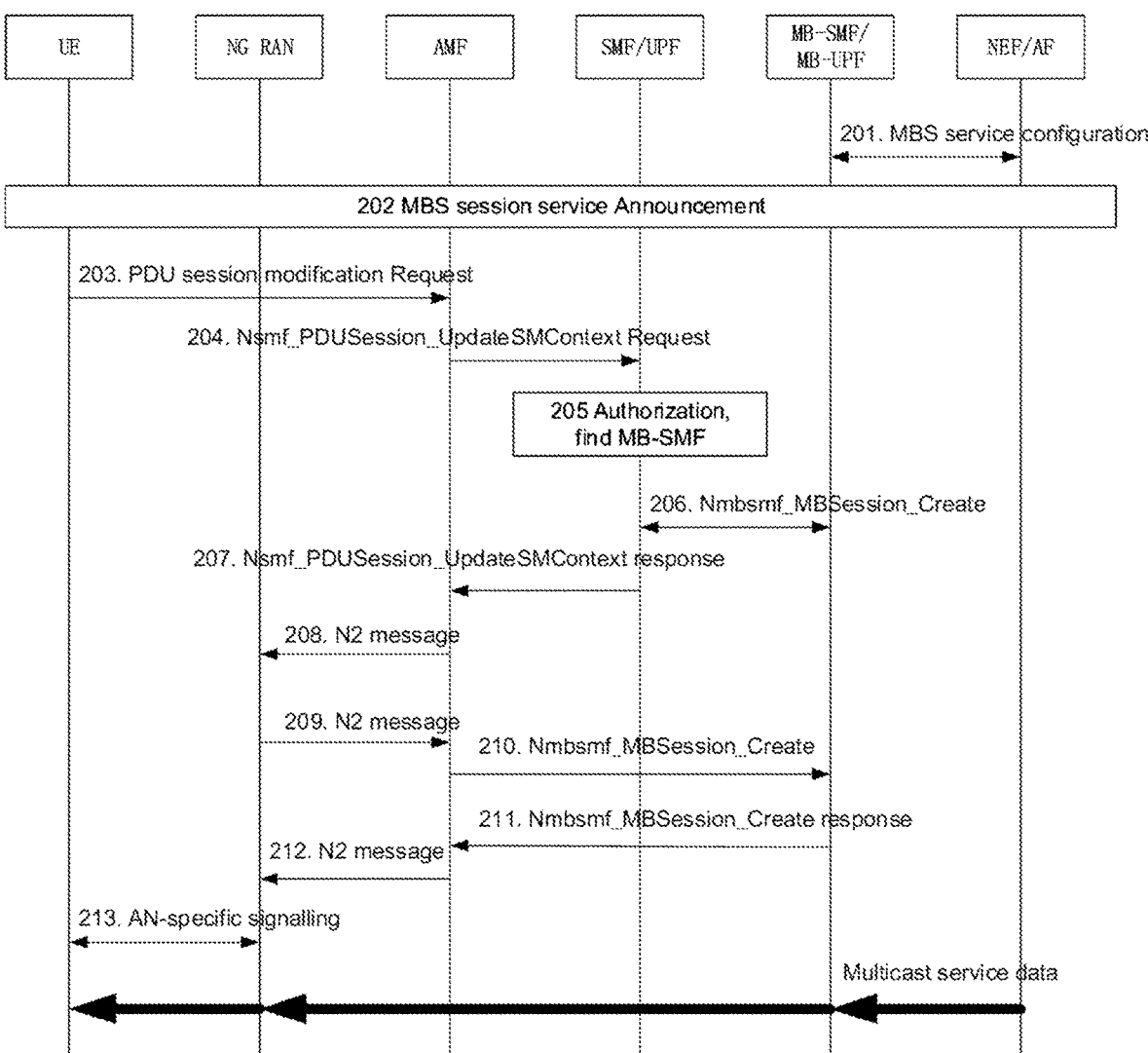
FIG. 2 shows a schematic diagram of a procedure according to an embodiment of the present disclosure.

FIG. 2 shows a schematic diagram of a procedure according to an embodiment of the present disclosure. FIG. 2 briefly illustrates how the UE joins the multicast MBS session.

In step 201, the AF requests the multicast MBS service to the NEF (including service requirements). The NEF finds an MB-SMF, which can control the corresponding MBS session. The MB-SMF allocates an MBS session ID for the MBS service and responds to the NEF/AF.

In step 202, the MBS session service announcement is sent to the UE, where the MBS session service announcement includes the MBS session ID, MBS service description. This step may be made in the application level.

In step 203, the UE sends a PDU session modification request (including the MBS session ID) to join the multicast MBS session. The MBS session ID indicates the multicast group the UE wants to join.

In step 204, the AMF invokes a Nsmf_PDUSession_UpdateSMContext request service operation to forward the UE request to the SMF.

In step 205, according to the received MBS session ID, the SMF recognizes the request is an MBS session join request. The SMF authorizes the MBS session join request. If the SMF does not know which MB-SMF controls this MBS session, the SMF checks with the NRF to find the MB-SMF.

In step 206, the SMF invokes a Nmbsmf_MBSSession_Create request (including the MBS session ID) to MB-SMF. The SMF interacts with the MB-SMF to retrieve multicast QoS flow information of the indicated MBS session.

In step 207, the SMF responds to AMF through a Nsmf_PDUSession_UpdateSMContext response (e.g. including N2 SM information (e.g. PDU session ID, MBS session ID, the MB-SMF ID, multicast QoS flow information, updated PDU session information, mapping between unicast QoS flow and multicast QoS flow information) and/or N1 SM container (e.g. comprising PDU session modification command)) to the AMF.

In step 208, the AMF sends the N2 message to the NG-RAN, where the N2 message includes N2 SM information and N1 SM container received from the SMF. The NG-RAN node may perform:

creating an MBS session context for the indicated MBS session in the RAN, if it does not exist already; and storing the mapping information between the multicast context and the PDU session of the UE to the RAN.

Note that, if the NG-RAN has already established the shared delivery with the MB-SMF/MB-UPF, steps 209 to 212 are not performed.

In addition, if a multicast transport mechanism is used for shared delivery, steps 209 to 212 are not performed. When the multicast transport mechanism is adopted, the NG-RAN sends IGMP/MLD (Internet Group Management Protocol/Multicast Listener Discovery) join request to join a multicast distribution tree.

If a unicast transport mechanism is used for shared delivery, steps 209 to 212 are performed.

In step 209, the NG-RAN signals, towards the AMF, an N2 message and the information for establishing the tunnel for downlink (DL) MBS transmissions. The N2 message includes the MB-SMF ID and the MBS session ID. If the NG-RAN node uses a unicast transport for shared delivery, the NG-RAN node allocates a DL tunnel ID for the reception of MBS data and includes the DL tunnel information in the request.

In step 210, the AMF invokes a Nnbsmf_MBSSession_Create request (comprising MBS session ID, tunnel info) towards the MB-SMF according to the received MB-SMF ID. If the NG-RAN node sends the DL tunnel information to the AMF, the AMF forwards the DL tunnel information to the MB-SMF.

In step 211, if the DL tunnel information is included, the MB-SMF configures the MB-UPF to transmit the MBS data for multicast towards the NG-RAN. The MB-SMF responds to the AMF through a Nmbsmf_MBSSession_Create response.

In step 212, the AMF forwards the N2 message to the NG-RAN node according to the N2 SM container in the received Nmbsmf_MBSSession_Create response.

In step 213, the NG-RAN issues an AN specific signaling exchange with the UE that is related with the MBS session resource reconfiguration. As part of the AN specific signaling exchange, the N1 SM container is provided to the UE.

After step 213, the NEF/AF is able to transmit the multicast service data to the UE via the NG-RAN node.

The local MBS is the MBS provided in particular MBS area(s). The MBS area may be identified by a cell list or a tracking area list. Only the UE within the MBS area may receive the content data of the local MBS. When moving out of the MBS area, the UE is not allowed to receive the content data of local MBS.

For the multicast MBS, the UE outside of the MBS area is not allowed to join the MBS and the network shall not deliver local MBS data to the UEs moving out of the MBS area.

In an embodiment, the local MBS service is also called location-dependent MBS.

The location dependent MBS is the local MBS that is provided in several MBS areas. The location dependent MBS enables distributions of different content data to different MBS areas.

In an embodiment, the MBS session ID is used to identify the MBS session. In addition, an additional area session ID is used for each MBS area. That is, the area session ID in combination with the MBS session ID uniquely identify the area of the MBS within the 5GS.

In the present disclosure, the area session ID may refer to area ID.

Figure 3:
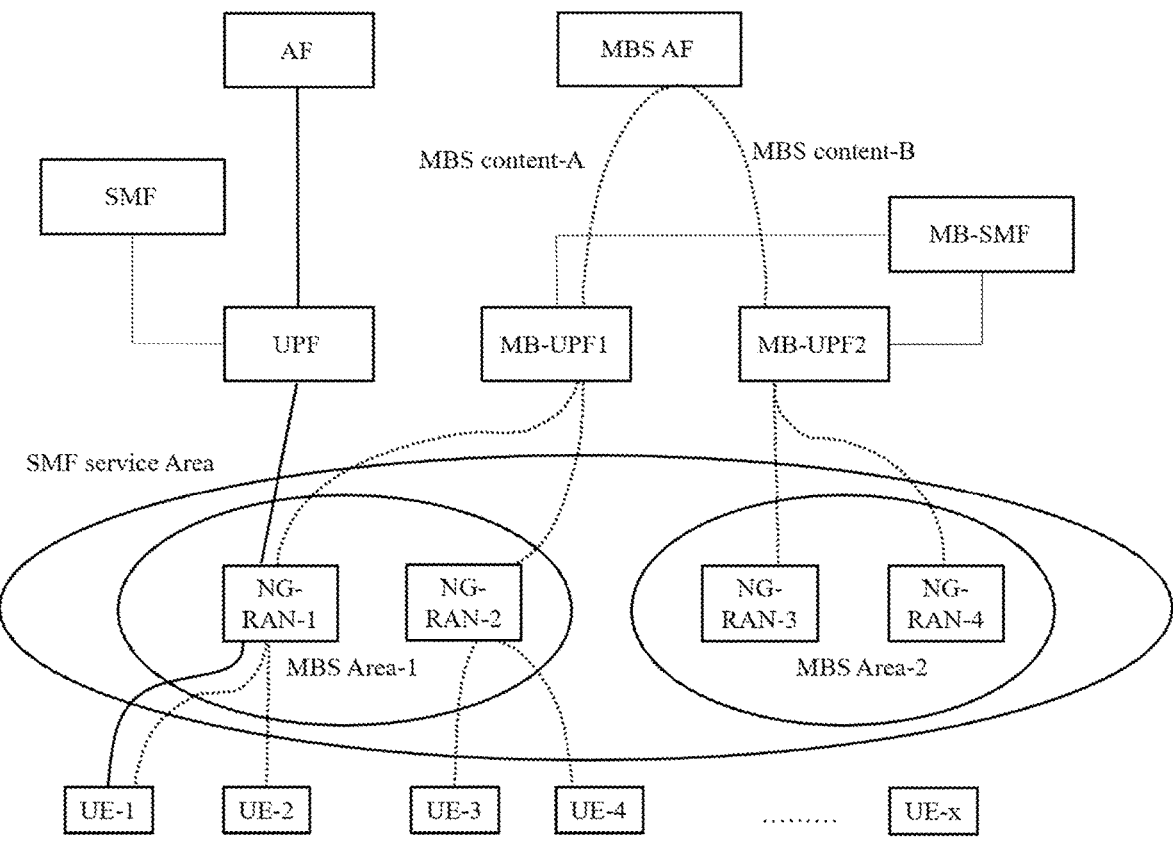
FIG. 3 shows a schematic diagram of a procedure according to an embodiment of the present disclosure.

FIG. 3 shows a schematic diagram of location dependent MBS and the unicast PDU session according to an embodiment of the present disclosure.

a path of transmitting data of the unicast PDU session to UE-1 is AF→UPF→NG-RAN-1→UE-1. In addition, the SMF service area includes the NG-RAN-1 to NG-RAN-4. That is, the UPF may send the data of the unicast PDU session to separate UE separately through one of the NG-RAN-1 to NG-RAN-4.

In an embodiment, an MBS session is identified by MBS session ID: MBS-A. There are two MBS service areas for the same MBS session MBS-A:

MBS area-1 consists of NG-RAN-1 and NG-RAN-2. The MBS area-1 is identified by Area-ID-1.
   MBS area-2 consists of NG-RAN-3 and NG-RAN-4. The MBS area-2 is identified by Area-ID-2.

The different content may be distributed to different MBS areas for the same MBS session (i.e., MBS-A), e.g., via dotted lines. For example, the MBS content-A is sent to the MBS area-1 (MB-UPF1 to NG-RAN-1 and NG-RAN2-2) and the MBS content-B is sent to MBS area-2 (MB-UPF2 to NG-RAN-3 and NG-RAN2-4). For MBS services that are not location dependent, the procedure is equivalent with one service area. Area-IS is not needed in this case.

Note that the UE may not be aware of the MBS service.
   Since the content delivered in different MBS service areas of the same MBS service is different, it has to be determined to which MBS service area the target NG-RAN belongs to during the handover procedure.

For example, in FIG. 3, if UE-1 moves from NG-RAN-1 to NG-RAN-2, the target NG-RAN (i.e. NG-RAN-2) is in the MBS Area-1. If UE-1 moves from NG-RAN-1 to NG-RAN-3, the target NG-RAN (i.e. NG-RAN-3) is in the MBS Area-2. If the target NG-RAN has not established the shared delivery, it shall receive the correct MBS content from the correct MB-UPF according to the MBS service area to which the NG-RAN belongs.

However, when the UE moves between different MBS service areas for the same MBS service, it is unclear how to determine the service area of the target RAN and how to establish the shared delivery between target RAN and MB-SMF.

In an embodiment, the MB-SMF sends each area session ID and associated MBS service area to the SMF for the related MBS session (identified by the MBS session ID).

In an embodiment, during the handover, the SMF sends the MB-SMF ID, the MBS session ID, the area session ID and the associated location area information to the target NG-RAN.

In an embodiment, for the Xn handover, the source NG-RAN indicates the target NG-RAN, the MBS session ID, and the local MBS indication. The source NG-RAN may send the area session ID of the source NG-RAN and the area session ID of target NG-RAN to the target NG-RAN. The area session ID can be a kind of local MBS indication. The target NG-RAN sends a path switch request to the AMF and the AMF invokes the Nsmf_PDUSession_UpdateSMContext request service operation to the SMF. The SMF responds the MB-SMF ID, the MBS session ID, the area session ID and the associated location area information to the AMF, and the AMF forwards the N2 SM container to the NG-RAN in the path switch request Ack.

In an embodiment, for the N2 handover, the NG-RAN sends a handover required request (e.g. HO required) to the AMF. The AMF invokes the Nsmf_PDUSession_UpdateSMContext request service operation to the SMF with the target NG-RAN information. According to the target NG-RAN information, the SMF responds (PDU session ID, N2 SM information). The N2 SM information includes the MB-SMF ID, the MBS session ID, the area session ID and the associated location area information. The AMF sends the N2 SM information to the target NG-RAN in the handover request, which includes the MBS session ID, the MB-SMF ID, the area session ID of the target NG-RAN and the corresponding location area information.

In an embodiment, for both Xn and N2 handover, if the shared delivery has not been established between NG-RAN and MB-UPF, the NG-RAN initiates the MBS session setup. It sends the N2 message to the AMF which comprises the MB-SMF ID, the MBS session ID, the area session ID and the NG-RAN ID. If unicast transport is used, the NG-RAN also sends DL tunnel information in the N2 message. The AMF invokes Nnbsmf_MBSSession_Create request (MBS session ID, area session ID) towards the MB-SMF according to the received MB-SMF ID. If the NG-RAN node sends the DL tunnel information to the AMF, the AMF forwards the DL tunnel information to the MB-SMF. If the unicast transport is used, the MB-SMF selects the MB-UPF according to the area session ID. If multicast transport is used, the MB-SMF may send a multicast address to the NG-RAN via the AMF according to the received area session ID. The NG-RAN therefore can send an IGMP/MLD join request to the multicast address.

Figure 4:
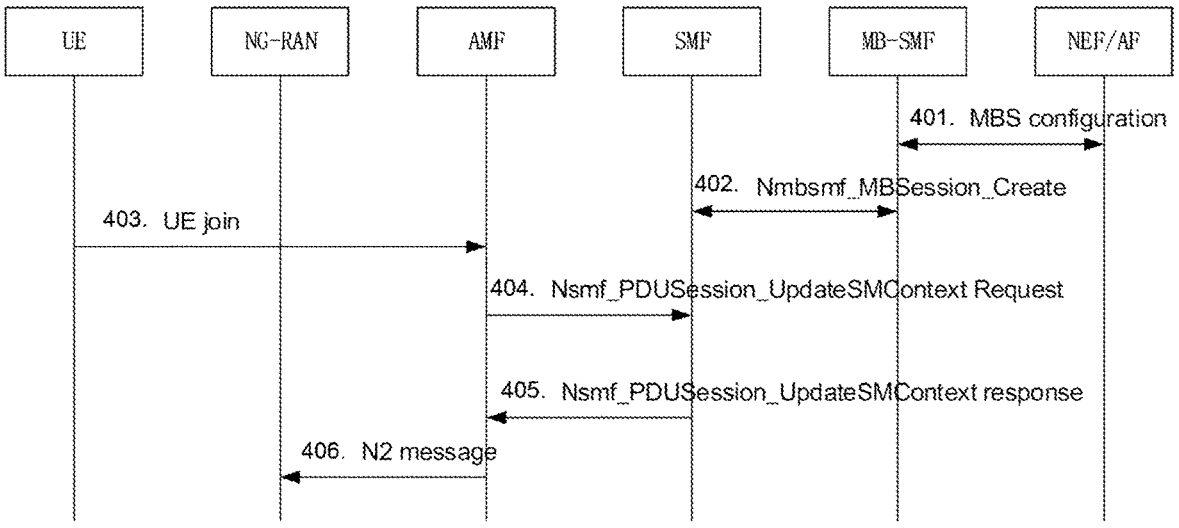
FIG. 4 shows a schematic diagram of a procedure according to an embodiment of the present disclosure.

FIG. 4 shows how the MBS service info is provided to the SMF, when the UE sends the join message to the AMF, and the SMF sending the MBS information to the NG-RAN in accordance with an embodiment of the present disclosure.

At step 401 the AF requests the multicast MBS service to the NEF (including service requirement and service area). The NEF finds an MB-SMF, which can control this MBS session. The MB-SMF allocates the MBS session ID for the MBS service and returns it to NEF/AF. The NEF converts the service area to 5GS internal location area information, e.g. TAI list or cell list, and provides this location area information to the MB-SMF.

The MB-SMF allocates the area session ID to the corresponding location area information. For example: (area ID-1, cell list-1), (area ID-2, cell list-2).

In general, there is no area overlapping between the serving areas corresponding to two area session IDs, e.g. cell-1 is only assigned to area-1 or area-2, but may not belong to both area-1 and area-2.

If the multicast transport is used, the multicast address is assigned for each area session ID.

At step 402 the SMF invokes Nmbsmf_MBSSession_Create request (MBS Session ID) to the MB-SMF. The SMF interacts with the MB-SMF to retrieve multicast QoS flow information of the indicated MBS session. The MB-SMF sends each area session ID and associated MBS service area to the SMF for the MBS session.

If multicast transport is used, the MB-SMF may also send a multicast address for each area session ID to the SMF.

Step 402 may be triggered by the first UE joining message (i.e. step 403, 404).

At step 403 the UE sends the PDU session modification request (MBS Session ID) to join the multicast MBS session. MBS session ID indicates the multicast group the UE wants to join.

At step 404 the AMF invokes the Nsmf_PDUSession_UpdateSMContext request service operation to forward the UE join message to the SMF.

At step 405, according to the received MBS Session ID, the SMF recognizes that this is an MBS session join request. If the UE is the first UE to join the MBS session, the SMF checks the MB-SMF and step 402 is performed.

The SMF responds to the AMF through a Nsmf_PDUSession_UpdateSMContext response (N2 SM information (PDU session ID, MBS session ID, MB-SMF ID, area session ID and the corresponding location area information, multicast QoS flow information, updated PDU session information, mapping between unicast QoS flow and multicast QoS flow information), N1 SM container (e.g. comprising PDU session modification command)) to the AMF.

If multicast transport is used, N2 SM information may include a multicast address for the area session if received from the MB-SMF.

At step 406 the AMF sends the N2 message to the NG-RAN, which includes N2 SM information and N1 SM container received from the SMF.

Figure 5:
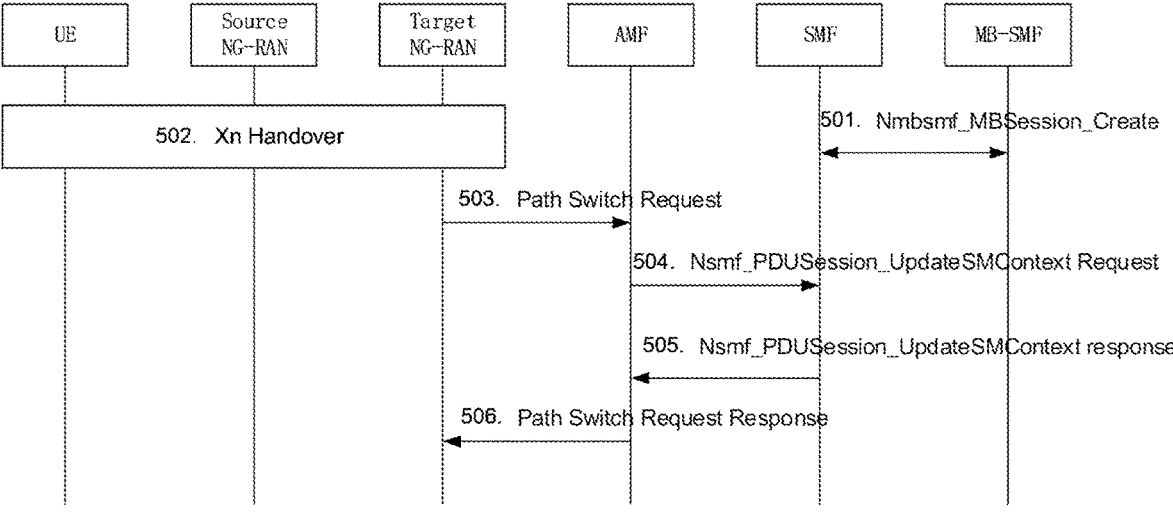
FIG. 5 shows a schematic diagram of a procedure according to an embodiment of the present disclosure.

FIG. 5 shows how the area session information is sent to the target NG-RAN during the Xn handover. For simplicity and a better understanding, unrelated steps have been omitted in FIG. 5.

Before step 501 the same step as step 401 may be performed. Step 501 may be the same as step 402. The SMF invokes Nmbsmf_MBSSession_Create request (comprising MBS session ID) to the MB-SMF. The SMF interacts with the MB SMF to retrieve multicast QoS flow information of the indicated MBS session. The MB-SMF sends each area session ID and the associated MBS service area to the SMF for the MBS session.

If multicast transport is used, the MB-SMF also sends a multicast address for each area session ID to the SMF.

At step 502 the UE has already joined the MBS session as described in FIG. 4. When the UE moves from coverage of the source NG-RAN to the target NG-RAN, the Xn handover may be triggered.

In the Xn handover, the source NG-RAN sends the MBS session ID and associated PDU session ID and the local MBS indication to the target NG-RAN. The source NG-RAN may send the area session ID of the source NG-RAN and the area session ID of the target NG-RAN to the target NG-RAN. The source NG-RAN may know the area session ID of the target NG-RAN if the SMF sends each area session ID and associated MBS service area to the SMF as described in step 406 of FIG. 4.

The area session ID can be a kind of local MBS indication.

At step 503 the target NG-RAN sends the path switch request to the AMF with the MBS session ID and the associated PDU session ID.

At step 504 the AMF invokes the Nsmf_PDUSession_UpdateSMContext request service operation to the SMF with the MBS session ID.

At step 505 the SMF responds to the AMF through Nsmf_PDUSession_UpdateSMContext response (N2 SM information). The N2 SM information includes MBS session ID, MB-SMF ID, area session ID of the target NG-RAN and the corresponding location area information.

If the multicast transport is used, N2 SM information may include a multicast address for the area session if received from the MB-SMF.

At step 506 the AMF sends the path switch request Ack to the target NG-RAN, which includes N2 SM information received from the SMF.

The subsequent shared delivery establishment between the target NG-RAN and the MB-SMF/MB-UPF is described in FIG. 7 below.

Figure 6:
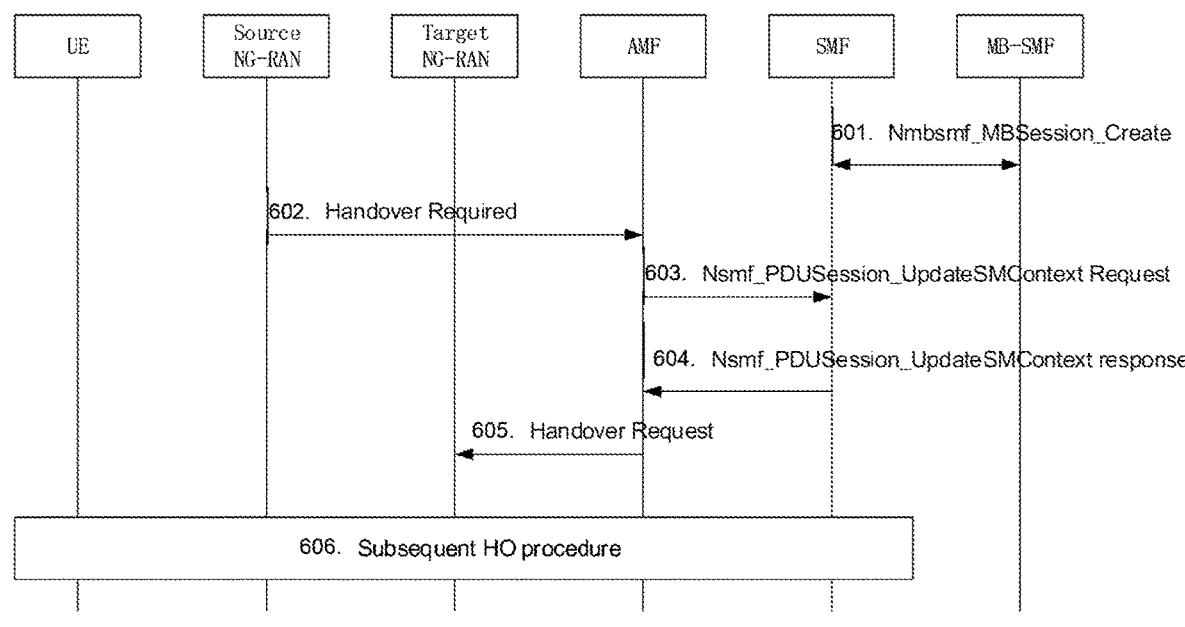
FIG. 6 shows a schematic diagram of a procedure according to an embodiment of the present disclosure.

FIG. 6 shows how the area session information is sent to the target NG-RAN during the N2 handover. For simplicity and a better understanding, unrelated steps have been omitted in FIG. 6.

Before step 601, the step 401 has been performed. Step 601 is the same as step 402. The SMF invokes Nmbsmf_MBSSession_Create request (MBS session ID) to the MB-SMF. The SMF interacts with the MB-SMF to retrieve multicast QoS flow information of the indicated MBS session. The MB-SMF sends each area session ID and associated MBS service area to the SMF for the MBS session.

If multicast transport is used, MB-SMF also send a multicast address for each area session ID to the SMF.

At step 602 the UE has already joined the MBS session as described in FIG. 4. When the UE moves from coverage of the source NG-RAN to the target NG-RAN, the N2 handover may be triggered. In the N2 handover, the source NG-RAN sends the handover required to the AMF.

At step 603 the AMF invokes the Nsmf_PDUSession_UpdateSMContext (PDU session ID, target ID, N2 SM information) request service operation to the SMF.

At step 604, according to the target NG-RAN information (i.e. target ID), the SMF knows the area session ID of the target NG-RAN according to the association of the area session ID and the MBS service area received in step 601.

The SMF responds to the AMF through Nsmf_PDUSession_UpdateSMContext response (N2 SM information). The N2 SM information includes MBS session ID, MB-SMF ID, area session ID of the target NG-RAN and the corresponding location area information.

If multicast transport is used, N2 SM information may include a multicast address for the area session ID if received from the MB-SMF.

At step 605 the AMF sends a handover request to the target NG-RAN. It includes the MBS session ID, the MB-SMF ID, the area session ID of the target NG-RAN and the corresponding location area information.

At step 606 the normal subsequent handover procedure is performed.

The subsequent shared delivery establishment between the target NG-RAN and the MB-SMF/MB-UPF is described in FIG. 7 below.

Figure 7:
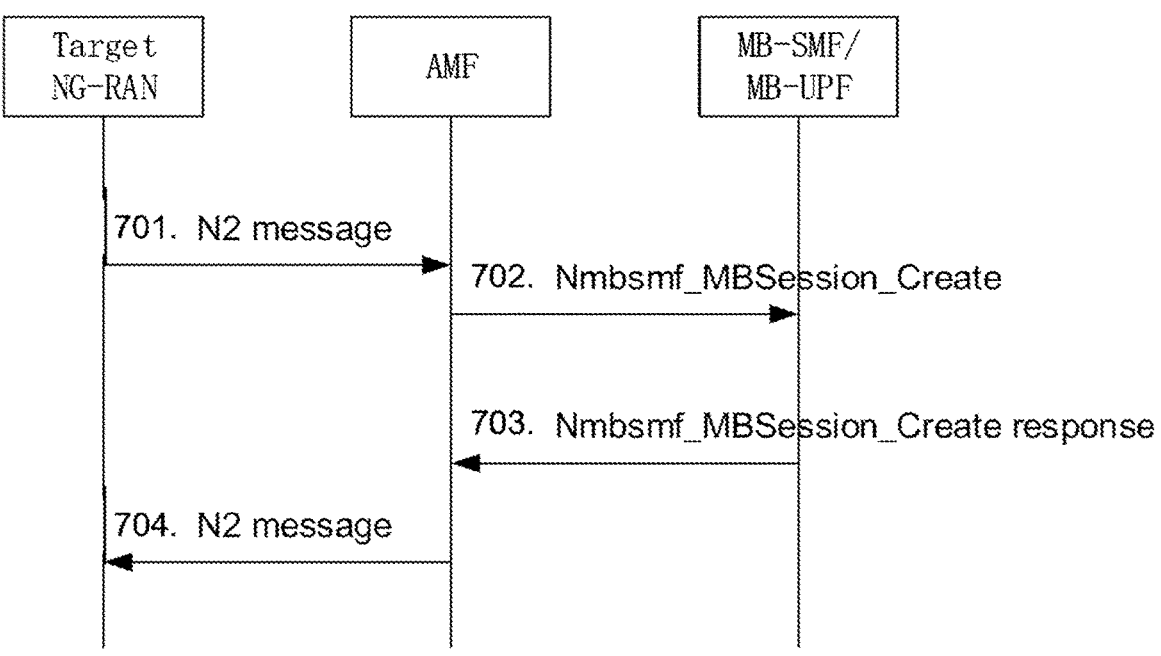
FIG. 7 shows a schematic diagram of a procedure according to an embodiment of the present disclosure.

FIG. 7 shows how the shared delivery is established between the target NG-RAN and the MB-SMF/MB-UPF.

After step 506 and 605, if the shared delivery is not established between the target NG-RAN and the MB-SMF/MB-UPF for the MBS session, step 701 to 704 are performed.

At step 701 the target NG-RAN signals a N2 message towards the AMF, and the information for establishing the tunnel for the DL MBS transmission. The N2 message includes the MB-SMF ID, the MBS session ID, the area session ID and the target NG-RAN ID. If the target NG-RAN node uses a unicast transport for shared delivery, it allocates a downlink tunnel ID for the reception of the MBS data and includes the downlink tunnel information in the request.

At step 702 the AMF invokes Nnbsmf_MBSSession_Create request (MBS session ID, area session ID) towards the MB-SMF according to the received MB-SMF ID. If the NG-RAN node sends the DL tunnel information to the AMF, the AMF forwards it to the MB-SMF. The AMF may also send the NG-RAN ID to the SMF.

At step 703 the MB-SMF responds to the AMF to through Nmbsmf_MBSSession_Create response. If downlink tunnel information is included, the MB-SMF selects appropriate the MB-UPF and configures the MB-UPF to transmit the MBS data for multicast towards the NG-RAN. If the multicast transport is used, the MB-SMF also includes the multicast address for the MBS session in the response.

At step 704 the AMF forwards the N2 message to the target NG-RAN node according to the N2 SM container in the received Nmbsmf_MBSSession_Create response.

If the NG-RAN receives the multicast address in the N2 message, it sends the IGMP/MLD join request to join the multicast distribution tree to receive the media.

Figure 8:
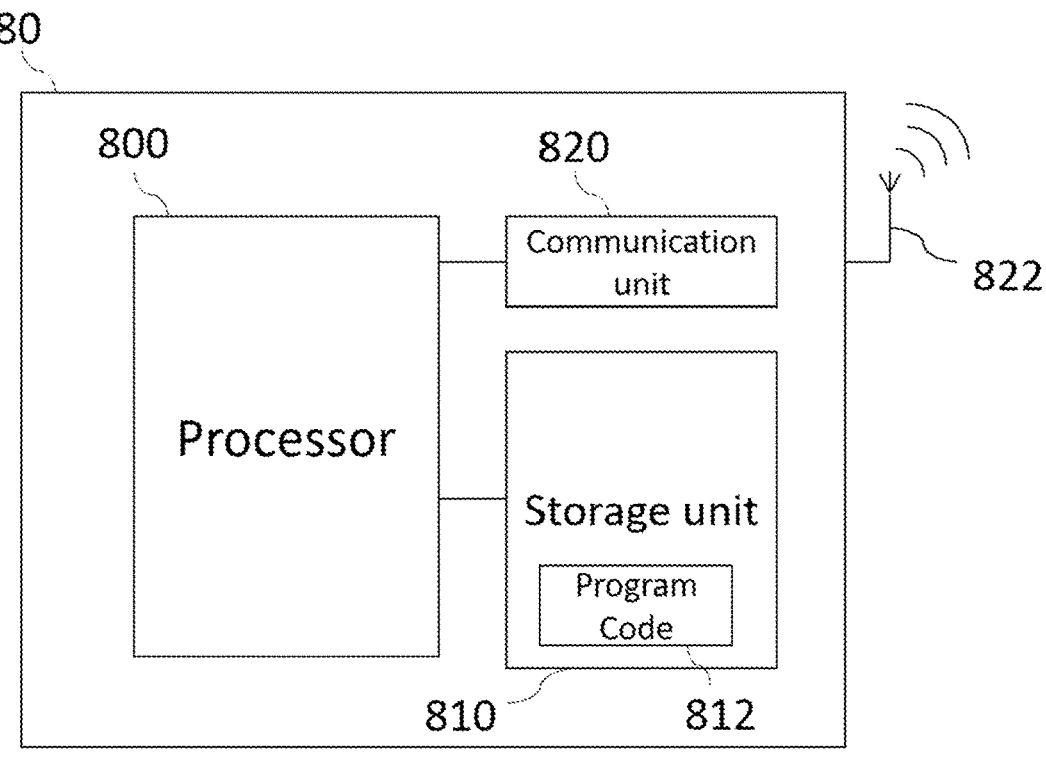
FIG. 8 shows an example of a schematic diagram of a wireless terminal according to an embodiment of the present disclosure.

FIG. 8 relates to a schematic diagram of a wireless terminal 80 according to an embodiment of the present disclosure. The wireless terminal 80 may be a user equipment (UE), a mobile phone, a laptop, a tablet computer, an electronic book or a portable computer system and is not limited herein. The wireless terminal 80 may include a processor 800 such as a microprocessor or Application Specific Integrated Circuit (ASIC), a storage unit 810 and a communication unit 820. The storage unit 810 may be any data storage device that stores a program code 812, which is accessed and executed by the processor 800. Embodiments of the storage unit 812 include but are not limited to a subscriber identity module (SIM), read-only memory (ROM), flash memory, random-access memory (RAM), hard-disk, and optical data storage device. The communication unit 820 may a transceiver and is used to transmit and receive signals (e.g. messages or packets) according to processing results of the processor 800. In an embodiment, the communication unit 820 transmits and receives the signals via at least one antenna 822 shown in FIG. 8.

In an embodiment, the storage unit 810 and the program code 812 may be omitted and the processor 800 may include a storage unit with stored program code.

The processor 800 may implement any one of the steps in exemplified embodiments on the wireless terminal 80, e.g., by executing the program code 812.

The communication unit 820 may be a transceiver. The communication unit 820 may as an alternative or in addition be combining a transmitting unit and a receiving unit configured to transmit and to receive, respectively, signals to and from a wireless network node (e.g. a base station).

Figure 9:
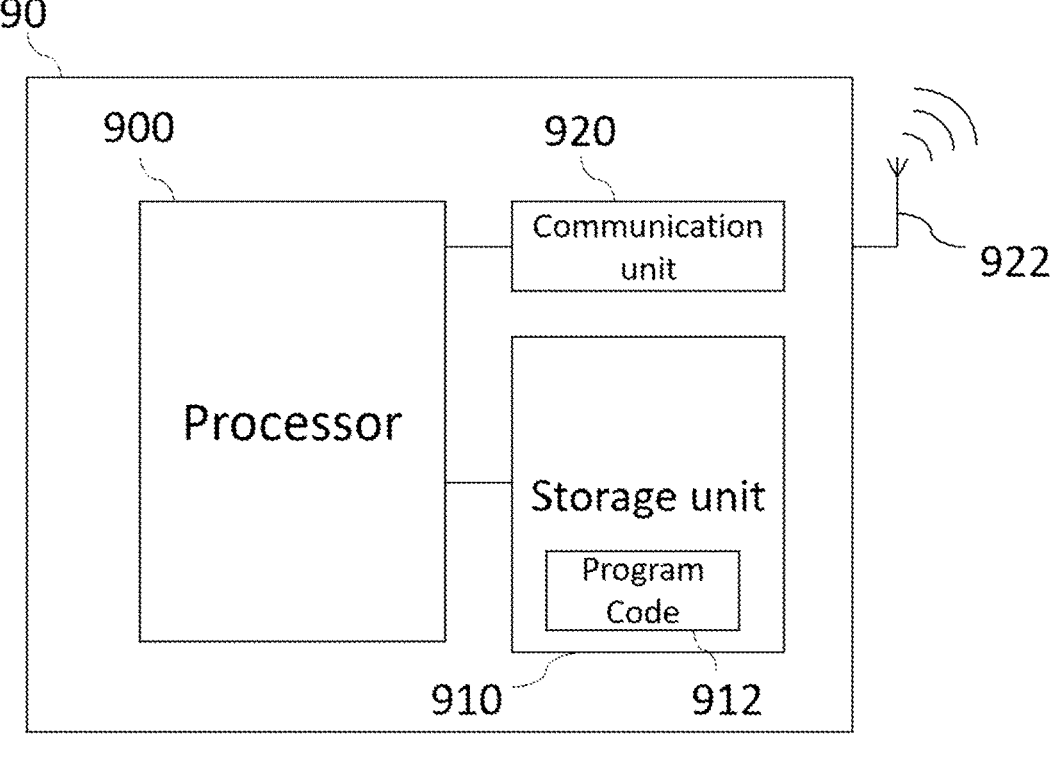
FIG. 9 shows an example of a schematic diagram of a wireless network node according to an embodiment of the present disclosure.

FIG. 9 relates to a schematic diagram of a wireless network node 90 according to an embodiment of the present disclosure. The wireless network node 90 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 90 may comprise (perform) at least one network function such as an access and mobility management function (AMF), a session management function (SMF), a user place function (UPF), a policy control function (PCF), an application function (AF), an MB-SMF, etc. The wireless network node 90 may include a processor 900 such as a microprocessor or ASIC, a storage unit 910 and a communication unit 920. The storage unit 910 may be any data storage device that stores a program code 912, which is accessed and executed by the processor 900. Examples of the storage unit 912 include but are not limited to a SIM, ROM, flash memory, RAM, hard-disk, and optical data storage device. The communication unit 920 may be a transceiver and is used to transmit and receive signals (e.g. messages or packets) according to processing results of the processor 900. In an example, the communication unit 920 transmits and receives the signals via at least one antenna 922 shown in FIG. 9.

In an embodiment, the storage unit 910 and the program code 912 may be omitted. The processor 900 may include a storage unit with stored program code.

The processor 900 may implement any steps described in exemplified embodiments on the wireless network node 90, e.g., via executing the program code 912.

The communication unit 920 may be a transceiver. The communication unit 920 may as an alternative or in addition be combining a transmitting unit and a receiving unit configured to transmit and to receive, respectively, signals to and from a wireless terminal (e.g. a user equipment or another wireless network node).

FIG. 10 shows a flowchart of a method according to an embodiment of the present disclosure. The method shown in FIG. 10 may be used in a target wireless network node (e.g. NG-RAN) and comprises the following step:

Step 1001: Receive, from a network function, an area ID of the target wireless network node in an MBS session during a handover of the MBS session to the target wireless network node.

In the embodiment shown in FIG. 10, during a handover (procedure) of an MBS session to the target wireless network, the target wireless network node receives its area ID associated with an MBS session from a network function. For example, the target wireless network node may receive its area ID from a source wireless network node associated with the handover and/or an SMF.

In an embodiment of the network function comprising the source wireless network node (e.g., Xn handover), the target wireless network node may further receive an area identifier of the source wireless network node from the source wireless network node.

In an embodiment of the target wireless network node receiving its area ID from the SMF, the target wireless network node may transmit a path switch request associated with the MBS session (e.g., comprising corresponding MBS session ID_ to the SMF and receives the area ID in a path switch response (see, e.g., steps 503 to 506).

In an embodiment, the area identifier of the target wireless network node is received in a handover request, e.g., from the SMF and/or the AMF (e.g., N2 handover). For example, the SMF transmits a PDU session update response to the AMF and the AMF accordingly generates and transmits the handover request to the target network node (see, e.g., steps 604 and 605).

In an embodiment, the target wireless network node may further receive location information corresponding to the area ID, e.g., from the SMF and/or the AMF. In an embodiment, the location information is received in the handover request. The location information may comprise at least one of a TAI list associated with the area ID, a cell list associated with the area ID, a multicast address associated with the area ID or a multicast address associated with the MBS session.

In an embodiment, the target wireless network node may transmit a request for establishing a downlink tunnel of the MBS session to an MB-SMF (e.g., via AMF), to build a shared delivery between the target wireless network node and the MB-SMF. Note that, the request comprises the area ID of the target wireless network node. In an embodiment, the request may comprise downlink tunnel information of the downlink tunnel.

In an embodiment, the target network node may further receive a response comprising a multicast address associated with the area identifier or a multicast address associated with the MBS session, e.g., if the multicast transport is adopted.

FIG. 11 shows a flowchart of a method according to an embodiment of the present disclosure. The method shown in FIG. 11 may be used in an SMF (e.g., a wireless device comprising/performing the functionalities of the SMF) and comprises the following step:

Step 1101: Transmit, to a target wireless network node, an area ID of the target wireless network node in an MBS session during a handover of the MBS session to the target wireless network node.

In FIG. 11, during a handover (procedure) of an MBS session to the target wireless network, the SMF transmits an area ID of the target wireless network node in the MBS session to the target wireless network node.

In an embodiment, the SMF may receive a path switch request associated with the MBS session from the target wireless network node and transmit the area ID of the target wireless network node in a path switch response (see, e.g., steps 503 to 506).

In an embodiment, the SMF may transmit the area ID of the target wireless network node in a handover request to the target wireless network node (e.g., N2 handover). For example, the SMF transmits a PDU session update response to the AMF and the AMF accordingly creates and transmits the handover request to the target network node (see, e.g., steps 604 and 605).

In an embodiment, the SMF may further transmit location information corresponding to the area ID of the target wireless network node (e.g., in the handover request). For example, the location information may comprise at least one of a TAI list associated with the area ID, a cell list associated with the area ID, a multicast address associated with the area ID or a multicast address associated with the MBS session. In an embodiment, the SMF may receive information of a correlation between each area ID associated with the MBS session and corresponding location information from an MB-SMF.

FIG. 12 shows a flowchart of a method according to an embodiment of the present disclosure. The method shown in FIG. 12 may be used in a source wireless network node (e.g., NG-RAN) and comprises the following step:

Step 1201: Transmit, to a target wireless network node, an area ID of the target wireless network node in an MBS session during a handover of the MBS session from the source wireless network node to the target wireless network node.

In this embodiment, during a handover (e.g., Xn handover) of an MBS session from the source wireless network node to a target wireless network node, the source wireless network node transmits an area ID of the target wireless network node in the MBS session to the target wireless network node. The source wireless network node may further transmit an area ID of the source wireless network node to the target wireless network node.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a target wireless network node, the method comprising:
   receiving, from a network function, an area identifier of the target wireless network node in a multicast broadcast service (MBS) session during a handover of the MBS session to the target wireless network node, wherein the network function comprises a session management function; and
   transmitting, to the session management function, a path switch request associated with the MBS session, wherein the area identifier is received in a response of the path switch request.

2. The wireless communication method of claim 1, wherein the network function comprises a source wireless network node associated with the handover.

3. The wireless communication method of claim 2, further comprising:
   receiving, from the source wireless network node, an area identifier of the source wireless network node.

4. The wireless communication method of claim 1, wherein the area identifier of the target wireless network node is received in a handover request.

5. The wireless communication method of claim 1, further comprising:
   receiving, location information corresponding to the area identifier,
   wherein the location information comprises at least one of a tracking area identity list associated with the area identifier, a cell list associated with the area identifier, a multicast address associated with the area identifier or a multicast address associated with the MBS session.

6. The wireless communication method of claim 1, further comprising:
   transmitting, to a multicast broadcast session management function of the MBS session, a request for establishing a downlink tunnel of the MBS session, wherein the request comprises the area identifier of the target wireless network node.

7. The wireless communication method of claim 6, further comprising:
   receiving, from the multicast broadcast session management function, a response comprising a multicast address associated with the area identifier or a multicast address associated with the MBS session.

8. A wireless communication method for use in a session management function, the method comprising:
   transmitting, to a target wireless network node, an area identifier of the target wireless network node in a multicast broadcast service (MBS) session during a handover of the MBS session to the target wireless network node; and receiving, from the target wireless network node, a path switch request associated with the MBS session, wherein the area identifier of the target wireless network node is transmitted in a response of the path switch request.

9. The wireless communication method of claim 8, wherein the area identifier of the target wireless network node is transmitted in a handover request.

10. The wireless communication method of claim 8, further comprising:

transmitting, to the target wireless network node, location information corresponding to the area identifier of the target wireless network node, wherein the location information comprises at least one of a tracking area identity list associated with the area identifier, a cell list associated with the area identifier, a multicast address associated with area identifier or a multicast address associated with of the MBS session.

11. The wireless communication method of claim 8, further comprising:

receiving, from a multicast broadcast session management function, information of a correlation between each area identifier associated with the MBS session and corresponding location information, wherein the location information comprises at least one of a tracking area identity list associated with the area identifier, a cell list associated with the area identifier, a multicast address associated with the area identifier or a multicast address associated with of the MBS session.

12. A target wireless network node, comprising:

a communication unit, configured to:

receive, from a network function, an area identifier of the target wireless network node in a multicast broadcast service (MBS) session during a handover of the MBS session to the target wireless network node, wherein the network function comprises a session management function; and transmit, to the session management function, a path switch request associated with the MBS session, wherein the area identifier is received in a response of the path switch request.

* * * * *